July 9, 1957 N. C. CRAIG 2,798,732
FOLDABLE GARDENING CART
Filed Sept. 8, 1955
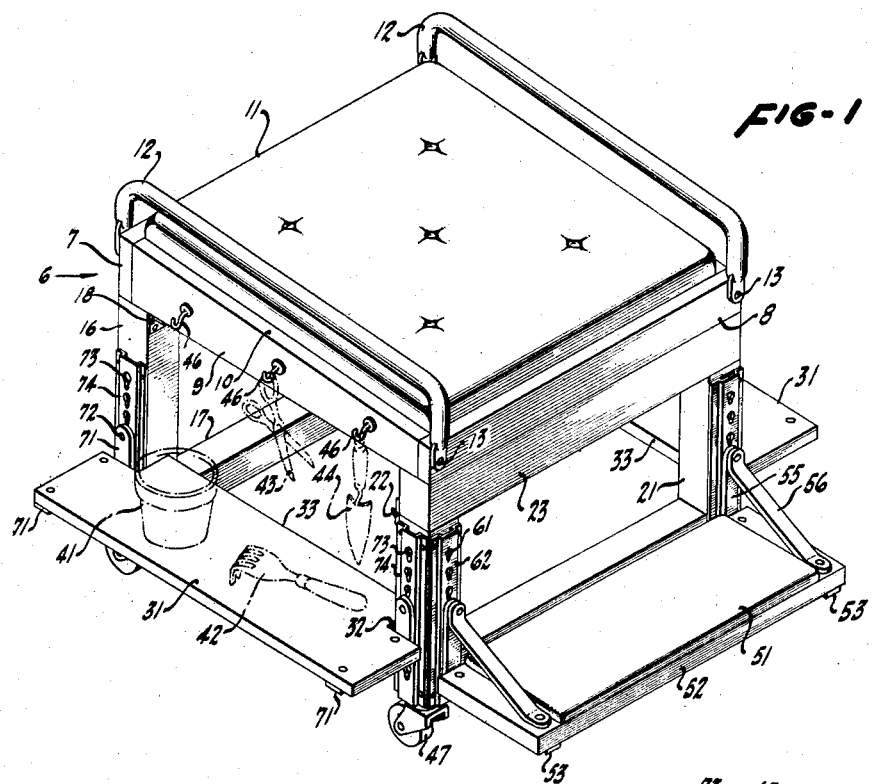
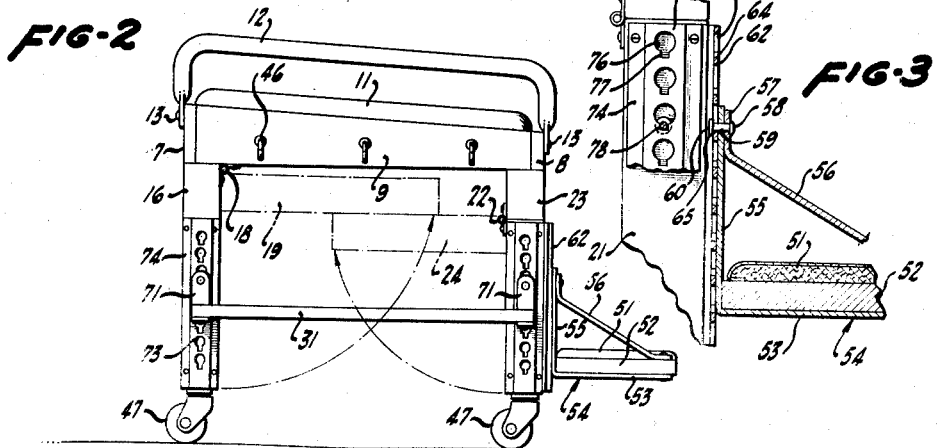
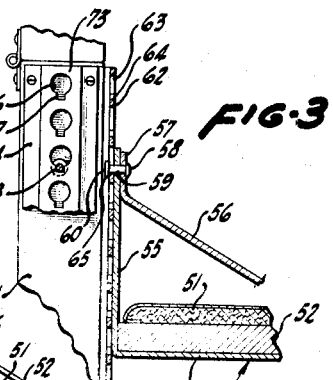
INVENTOR.
NINA C. CRAIG
BY Lothrop + West
ATTORNEYS

United States Patent Office 2,798,732
Patented July 9, 1957

2,798,732
FOLDABLE GARDENING CART
Nina C. Craig, Sacramento, Calif.

Application September 8, 1955, Serial No. 533,161

3 Claims. (Cl. 280—41)

The invention relates to carts, and, more especially, to carts adapted to support the body and knees of a gardener and to carry miscellaneous gardener's tools and accessories.

Many persons, and particularly older persons or those suffering from infirmities making it difficult to bend over and straighten up, find it necessary owing to these reasons to give up gardening. Still others forego the pleasures of gardening because they do not wish to kneel in damp ground or to change into the old clothes required by gardening.

It is therefore an object of the invention to provide a carryall device for gardeners which enables the user to perform gardening work while kneeling on a comfortable upholstered pad elevated from the ground.

It is another object of the invention to provide a gardener's device capable of comfortably supporting the user's chest and abdominal areas while leaving the arms free to perform gardening work.

It is still another object of the invention to provide a device which is highly mobile to enable a gardener easily to move the device from place to place in the garden though the user is in kneeling position.

It is yet another object of the invention to provide a carryall apparatus capable of supporting various gardening accessories and tools such as pots, bags of fertilizer, trowels and shears.

It is a further object of the invention to provide a mobile device which is sturdy and durable yet which can be folded when not in use to conserve storage space.

It is a still further object of the invention to provide a gardening device which is relatively inexpensive and which is therefore within the economic reach of all persons interested in such a device.

It is a yet further object of the invention to provide a carryall which is easily adjustable to suit the physical characteristics or personal desires of the user.

It is another object of the invention to provide a gardening accessory which is stable and safe to use and which provides convenient hand supports enabling a person easily to lower and raise the body to and from the kneeling position.

It is still another object of the invention to provide a device enabling the user to perform gardening work without getting the user's clothes dirty.

It is yet another object of the invention to provide a device which can be used as a comfortable and convenient garden seat.

It is a still further object of the invention to provide a generally improved gardener's carryall cart.

Other objects, together with the foregoing, are attained in the device described below and shown in the accompanying drawings, in which:

Figure 1 is a perspective view of the device showing in outline several of the typical miscellaneous tools and accessories used by a gardener and supported by the device.

Figure 2 is a side elevation of the device showing in outline the position of the legs when the device is in folded position.

Figure 3 is a view, to an enlarged scale, of the right-hand leg shown in Figure 2, a portion of the knee rest and adjustable track support being shown in section, a portion of the figure being broken away to reduce the extent thereof.

While the gardener's carryall of my invention is susceptible of numerous physical embodiments depending upon the particular uses to which the device is to be placed, the herein shown and described embodiment has performed in a highly satisfactory manner.

A frame 6 of the carryall device comprises an integral box-like structure including a front rail 7, a back rail 8 and a pair of opposite side boards 9. The front rail 7 is of a greater vertical dimension than the back rail 8 and the intermediate side boards 9 are correspondingly tapered or inclined so as to give to the uppermost edge 10 of the frame 6 a rearward and downward taper or inclination. On the top edge of the framework is mounted a suitably upholstered pad 11 capable of comfortably supporting the user's body and especially the chest and abdominal area. Adapted to furnish support to the user's hands and arms while kneeling and leaning onto the device and standing up therefrom, and serving, as well, to prevent the user's body from rolling off the pad 11 is a pair of sturdily constructed parallel rails 12 appropriately secured to the front and back rails by fastenings 13.

The front or leading edge of the framework 6 is supported by a pair of front legs 16 each held in fixed spatial relation from the other by a spacer rail 17 extending between the front legs and secured thereto. The pair of front legs 16 is pivotally mounted on the framework as by a suitable pair of hinges 18 about which the legs 16 can be swung upwardly and inwardly so as to occupy the position shown in outline in Figure 3 and designated by the numeral 19, when it is desired to store the apparatus.

A corresponding pair of rear legs 21 supports the rear or back edge of the frame 6, the rear legs being pivotally mounted with respect thereto by a pair of hinges 22. It is highly desirable, in order to conserve the maximum amount of space, to have the rear pair of legs 21 overlie closely the front pair of legs 16 when both pairs of legs are in folded position. Accordingly, an apron 23, or spacer block, is provided between the framework and the uppermost edge of the rear pair of legs 21 so that when the rear pair of legs is folded inwardly and forwardly to the position shown in outline in Figure 2, and designated by the numeral 24, the rear pair of legs closely underlies the front pair of legs 16 when both are in folded position.

While it is highly convenient that the leg pairs be foldable, in the manner shown, to conserve space, it is essential that when the legs are in vertical or body-supporting position that they be extremely rigid and that collapse of the legs be totally obviated. Accordingly, a shelf 31 is provided with a pair of rectangular cut out portions 32 adjacent the shelf's inner ends to form therebetween a spacer section 33, or bracing member, extending between the corresponding front and rear legs on each side of the device, and thus serving to space apart or spread apart the front and rear legs to a stiff, rigid vertical attitude. With the spacer portion 33 extending between the adjacent facing sides of the front and rear legs, the possibility of leg collapse is entirely obviated. Yet, upon removal of the shelves 31, the leg pairs can easily be swung into storage position.

Th shelf pair 31 serves not only, however, to space and brace the front and rear leg pairs, but also to provide a convenient supporting surface for the miscellaneous gardening tools and accessories, such as a pot 41, and a hand rake 42 commonly utilized by a gardener. Additional accessories, such as shears 43 and a trowel 44 are conveniently supported by appropriate hooks 46 secured to the sides of the framework 6.

Mobility is provided by appropriately mounted casters 47, or wheels, on the bottom ends of each of the legs.

The wheels 47 are of sufficient size to enable the gardener to propel the carryall about even though the gardener's body is in kneeling position and with the body fully supported by the upholstered pad 11. Since the user's arms are free and the hands able to touch the ground, considerable freedom of locomotion is availed.

With the user's chest and abdomen supported by the upholstered pad 11, the knees are comfortably supported by an upholstered pad 51 secured to a knee board 52, or knee rest, mounted on a horizontal section 53 of a strap 54 bent at right angles to provide a vertical leg 55 and strengthened by a diagonal brace 56 bent upwardly to form a vertical portion 57. The uppermost and innermost vertical portion 57 of the diagonal member 56 is ordinarily secured to the top portion of the vertical leg 55 of the bracket member 54 as by welding so as to provide strength. Extending through an opening in the vertical portion 57 and the vertical leg 55 is a bolt 58 having a stem 59 and terminating in a circular disk shaped cap 60, or button. In mounting the knee rest to the rear leg, the button 60 and adjacent stem portion 59 are inserted through the appropriate one of a plurality of apertures 61 in a slotted track 62 mounted on the rear side of the leg. Each of the apertures comprises a circular opening 63 with a rectangular shaped spur 64 projecting downwardly from and in connection with the circular portion 63. After the button 60 is inserted through the circular aperture 63, the knee pad is allowed to move vertically downwardly under its own weight or is pushed downwardly. The adjacent portion of the bolt stem 59 thereupon slides into and engages the rectangular spur 64. At this juncture the overhanging shoulders 65 of the disk 60 abut against the inside wall of the track, in the fashion shown most clearly in Figure 3, and prevent the button 60 from moving outwardly. Thus the knee rest is held in rigid position while the user is kneeling upon the pad; but vertical adjustment can be easily made merely by lifting the knee board slightly and moving it outwardly from the track. In a comparable fashion the shelves 31 on either side of the device can be vertically adjusted to suit the convenience and physical characteristics of the user. Thus, at each end of the shelf 31 there is provided a right-angled bracket member 71 provided with a bolt 72 extending inwardly and terminating in a cap disk, or button (not shown), and which fits within a corresponding one of a plurality of apertures 73 in a pair of slotted tracks 74 on the corresponding front and rear leg members. In a fashion similar to that previously described each of the apertures 73 comprises a circular opening 76 having a spur 77 behind which is confined the button shoulders 78.

In use, the gardener would customarily wheel the carryall device to the location at which work is to be commenced, and would thereupon kneel upon the knee rest portion, and, leaning forward from the waist, would rest the abdomen and chest against the upholstered pad 11, utilizing the hand rails 12 in lowering the body to kneeling and supported position. The necessary tools and accessories having been previously located upon the shelves and upon the hooks, the gardener is then able to perform gardening tasks, such as weeding or transplanting from pot to garden, or any of the numerous other jobs requiring attention. Should it be necessary to change the location the large wheels freely enable the gardener to propel the cart to such location. Since the user's shoulders and arms ordinarily extend beyond the front edge of the upholstered pad 11, full freedom is provided for the arm movements required by gardening; but, owing to the support provided by the upholstered pad, the gardener's body is fully supported and kept in relaxed attitude. The user's knees, furthermore, are in comfortable position on the knee rest which prevents the gardener's knees from getting soiled or dirty. The rails 12 serve to assist the user when it is desired to rise from the kneeling position. If the user decides, furthermore, that a change of posture would be helpful, it is merely necessary to turn around after arising and use the upholstered pad 11 as a seat.

It can therefore be seen that I have provided a compact movable device capable of carrying a considerable variety and number of gardener's tools and accessories, and also of supporting the user's body in a variety of comfortable attitudes. While the device is extremely safe owing to its rigidity and low center of gravity, the construction of the cart entables it easily to be folded into a volume considerably smaller than the volume required in fully extended position and therefore serves to save storage space. The device has been found to be especially helpful to older or injured persons or others suffering from infirmities and who, in absence of such a device, would be deprived of the therapeutic benefits, recreation and fundamental enjoyment to be derived from gardening.

What is claimed is:

1. A movable cart serving to support a gardener's knees and body comprising a rearwardly and downwardly inclined upholstered frame, a front pair of legs hingeably mounted on said frame, a rear pair of legs mounted on said frame, each of said leg pairs being adapted to swing inwardly toward the other into overlapping relation, a pair of shelves mounted on opposite sides of said frame, each of said shelves extending between the corresponding legs of said leg pairs to hold said legs in vertical attitude, means for connecting said legs and said shelves for vertical adjustment of said shelves, an upholestered knee board extending between said rear pair of legs, and means for connecting said board and said rear pair of legs for vertical adjustment of said board.

2. A cart for use in gardening comprising a box-like horizontal frame inclined rearwardly and downwardly on its upper edge, a first pair of legs mounted on the front corners of said frame and swingable from a vertical position to a horizontal position underlying said frame, said first pair of legs including a first pair of slotted tracks mounted on the outer side of said first pair of legs, a second pair of legs mounted on the rear corners of said frame and swingable from a vertical position to a horizontal position underlying said first pair of legs, said second pair of legs including a second pair of slotted tracks mounted on the outer sides of said second pair of legs, and further including a third pair of slotted tracks mounted on the rear sides of said second pair of legs, a pair of vertically adjustable shelves each adapted for engagement with the corresponding one of said first and said second pair of tracks whereby said legs are maintained for vertical attitude, and a vertically adjustable knee rest adapted for engagement with said third pair of tracks.

3. A gardener's accessory cart comprising a rectangular frame, an upholstered seat pad mounted on said frame and inclined thereto, a pair of hand rails on opposite sides of said frame parallel to said pad, a first pair of legs hingeably mounted on the front corners of said frame, a second pair of legs hingeably mounted on the rear corners of said frame, each of said pairs of legs being inwardly foldable to lie in overlapping relation with the other, a pair of vertically adjustable and removable shelves each extending between the corresponding one of said pairs of legs to hold said legs in vertical attitude, and a vertically adjustable knee board mounted on said second pair of legs.

References Cited in the file of this patent
UNITED STATES PATENTS

| 1,432,612 | O'Connor | Oct. 17, 1922 |
| 2,069,124 | Wojtalewicz et al. | Jan. 26, 1937 |
| 2,117,430 | Liska | May 17, 1938 |
| 2,246,457 | Schultz | June 17, 1941 |
| 2,436,647 | Huey | Feb. 24, 1948 |